United States Patent [19]

Westover

[11] Patent Number: 4,784,359
[45] Date of Patent: Nov. 15, 1988

[54] ADJUSTABLE SUPPORT FOR OPTICAL DEVICE

[75] Inventor: Dwight G. Westover, Sierra Madre, Calif.

[73] Assignee: TransTechnology Corporation, Sherman Oaks, Calif.

[21] Appl. No.: 31,167

[22] Filed: Mar. 26, 1987

Related U.S. Application Data

[63] Continuation of Ser. No. 712,014, Mar. 14, 1985, abandoned.

[51] Int. Cl.[4] ............................................. E04G 3/00
[52] U.S. Cl. ................................ 248/274; 248/295.1; 356/400; 382/65
[58] Field of Search .................. 382/50, 65, 66, 67, 382/69; 235/454, 479, 484; 250/234, 256; 356/400, 401; 248/225.31, 228, 274, 295.1

[56] References Cited

U.S. PATENT DOCUMENTS

| 903,302 | 3/1908 | Moore | 248/295.1 |
|---|---|---|---|
| 1,595,419 | 8/1926 | Woller | 248/295.1 |
| 2,518,694 | 8/1950 | Jannopoulo | 250/555 |
| 2,651,235 | 9/1953 | Barrows | 350/116 |
| 2,831,252 | 4/1958 | Weichselbaum | 33/125 R |
| 2,840,237 | 6/1958 | Vander Tuin et al. | 209/578 |
| 3,199,079 | 8/1965 | Kühne | 382/66 |
| 3,538,499 | 11/1970 | Rabinow et al. | 382/67 |
| 3,562,773 | 1/1969 | Wilamowski | 33/158 |
| 3,629,945 | 12/1971 | Liuzzo et al. | 33/488 |
| 3,737,629 | 6/1973 | See | 250/566 |
| 3,974,374 | 8/1976 | Inoue | 356/400 |
| 4,481,533 | 11/1984 | Alzmann et al. | 356/401 |

Primary Examiner—Ramon O. Ramirez
Attorney, Agent, or Firm—David Weiss

[57] ABSTRACT

A support for an optical device such as an optical read head, permits the optical device to be positionable along a linear path. The support includes a precision bar and two gibs, with first and second adjustable means for securing the gibs to one another and slideably to the bar.

21 Claims, 2 Drawing Sheets

ADJUSTABLE SUPPORT FOR OPTICAL DEVICE

This is a continuation of co-pending application Ser. No. 712,014 filed on Mar. 14, 1985, now abandoned.

BACKGROUND OF THE INVENTION

This invention relates to a mechanism for precisely positioning a device along a linear path, and more particularly to such a mechanism for supporting an optical device such as an optical character recognition read head in such manner as to be conveniently and easily positioned along a linear path having optical relation to the plane in which are located the characters to be read.

Optical systems often require a support arrangement for adjustably positioning optical devices in precise manner along a predetermined linear path. For example, in an optical character recognition system, an optical read head such as a video camera is supported to focus upon the optical characters which are situated in the object plane of the optical system. It is advantageous, as well, to be able to position the optical character recognition read head to focus upon a particular location in the object plane, such as a specific place along a line of print or a particular print line in a series of print lines, or to assure that a full character is centered within the read head's field of vision

SUMMARY OF THE INVENTION

The present invention finds utility wherever it is desired to adjustably position a device along a linear path, with sufficient precision to permit its use in optical environments. The device may be easily repositioned along the linear path in such manner as to maintain a substantially constant focal distance between the device and an object plane. Although the positionable device may itself be the subject for which adjustable movement is desired, a major objective of the present invention is to provide a mechanism to which an optical device may be mounted and which may be simply operated to position the optical device along a linear path parallel to an object plane such that the focal distance between the optical device and the object plane is maintained constant.

The present invention includes a precision bar having a longitudinal dimension which is adapted to be supported parallel to the object plane of the optical system. A first gib contains a grove or channel for receiving the bar along one of the bar's edge surfaces, while a second gib includes a groove or channel for receiving the bar along the bar's opposite edge surface. The gibs are secured to one another with the bar retained within the channels, by first adjustable means which controls the drag force between the gibs and the bar's edge surfaces when the secured gibs are slideably urged along the bar. Second adjustable means are carried by the gibs for controlling the drag force between the gibs and the bar's flat side surfaces extending between the bar's edge surfaces.

The first adjustable means includes pivot surfaces on each of the gibs, such pivot surfaces facing and in contact with one another and forming a pivot line parallel to the longitudinal dimension of the bar when the gibs are secured to one another and the bar is retained thereby, and means for adjustably urging the gibs to pivot toward one another about the pivot line such that the gibs clampedly bear against the edge surfaces of the bar.

The second adjustable means includes means carried by the gibs and adapted to adjustably cooperate with the two flat side surfaces extending between the bar's edge surfaces, such that a low friction bearing surface is provided along one of the flat side surfaces, which, when urged against such side surface, urges the gibs toward the bar's other flat side surface to control the drag force between the gibs and that other side surface of the bar.

BRIEF DESCRIPTION OF DRAWINGS

The novel features which are believed to be characteristic of the invention, together with further advantages thereof, will be better understood from the following description considered in connection with the accompanying drawings in which a preferred embodiment of the invention is illustrated by way of example, and wherein like reference numerals are utilized to indicate like components. It is to be expressly understood, however, that the drawings are for the purpose of illustration and description only, and are not intended as a definition of the limits of the invention.

FIG. 7 is a fragmentary detail of the lower portion of the clamping device as shown in FIG. 6 with the precision bar removed for clarity.

DESCRIPTION OF THE PREFERRED EMBODIMENT

Figure 1:
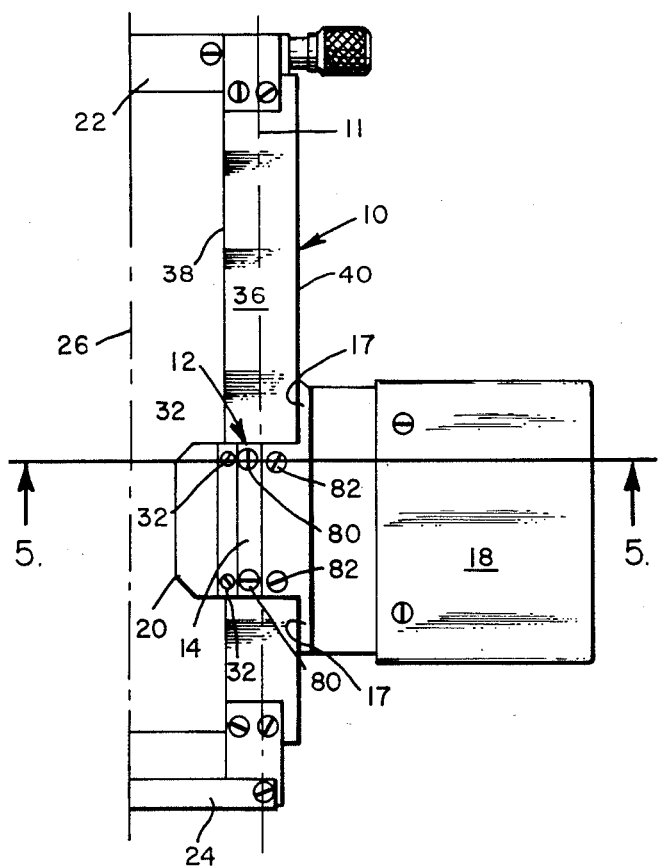
FIG. 1 is a side elevation view of a precision linearly positionable support mechanism according to the present invention, shown in combination with an optical devices arrangement mounted to the support mechanism.

Turning to FIG. 1, there is shown a preferred embodiment of a precision linearly positionable apparatus according to the present invention, including a precision bar 10 having a longitudinal dimension 11, and a clamping device 12 including a first clamp member or gib 14 and a second clamp member or gib 16.

In the preferred embodiment shown in the drawings, the invention is shown in an optical environment wherein an optical character recognition (or OCR) read head 18 and a light source 20 are mounted to the clamping device 12, which in turn is slideably clamped to the precision bar 10. The bar 10 is supported in a fixed position by means of brackets 22, 24, such that the longitudinal dimension 11 of the bar 10 is parallel to an object plane 26 containing indicia or characters which are to be read by the OCR read head 18. The lamp 20 may be used to illuminate the object plane 26. In the embodiment shown in the drawings, the gibs 14, 16 include an aperture 28 (see FIGS. 2, 3 and 4) for permitting optical access to the object plane 26 by the OCR read head 18.

Figure 2:
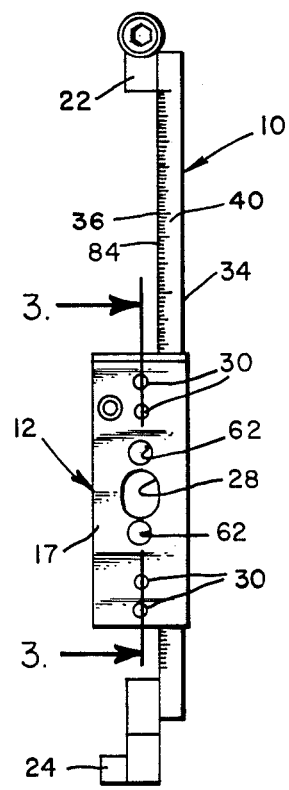
FIG. 2 is a rear elevation view of the support mechanism of FIG: 1, shown with the optical devices removed.
Figure 3:
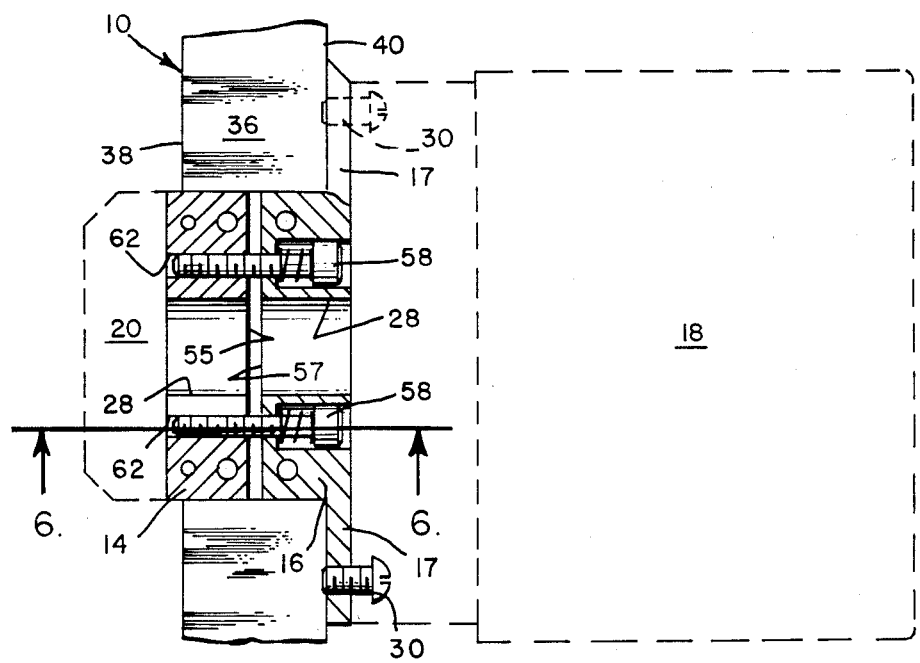
FIG. 3 is a part cross-sectional view of the apparatus of FIG. 1, viewed along the line 3—3 of FIG. 2 in the direction of the appended arrows.
Figure 4:
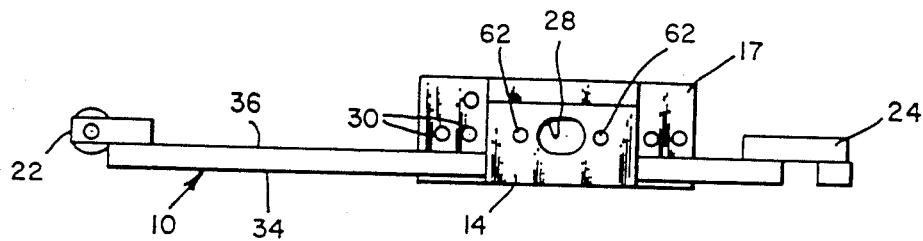
FIG. 4 is a front elevation view of the support mechanism of FIG. 1, shown with the optical devices removed.
Figure 5:
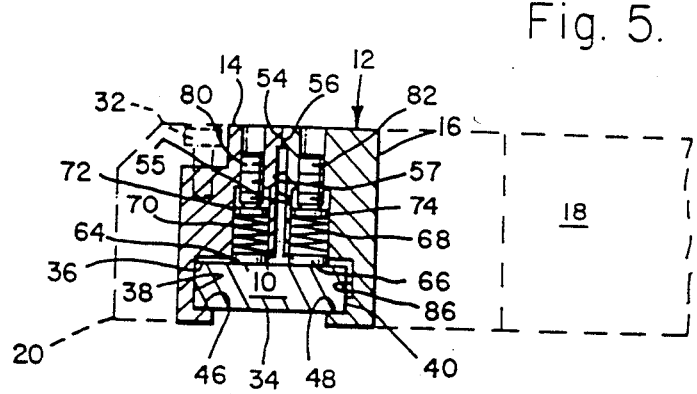
FIG. 5 is a part cross-sectional view of the apparatus of FIG. 1, viewed along the line 5—5 of FIG. 1 in the direction of the appended arrows.

The gib 16 may include extended mounting flanges 17, and the OCR read head 18 may be secured to the flanges 17 of the clamping device 12 by usual means, such as may be facilitated by aperture-screw combinations 30 indicated in FIGS. 2, 3 and 4, while the lamp housing 20 may be secured to the clamping device 12 by such means, for example, as aperture-screw combinations 32 indicated in FIGS. 1 and 5.

Figure 6:
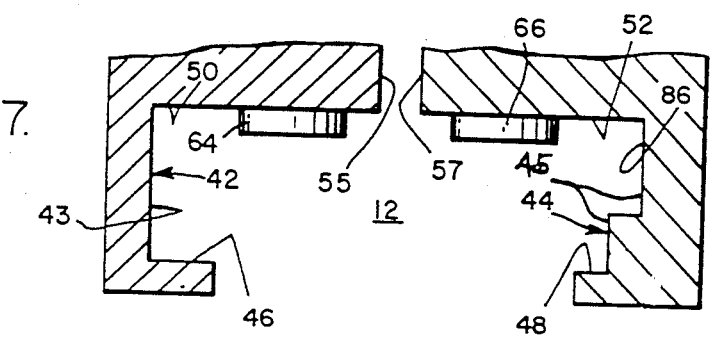
FIG. 6 is a cross-sectional view of the support mechanism of FIG. 1, viewed along line 6—6 of FIG. 3 in the direction of the appended arrows.
Figure 6:
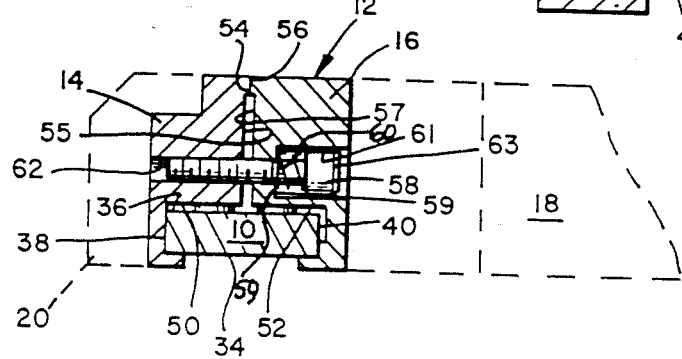

As best seen in FIGS. 1 and 2, the precision bar 10 has first and second flat side surfaces 34, 36 extending along the longitudinal dimension 11, and first and second edge surfaces 38, 40 between the first and second side surfaces 34, 36, also extending along the longitudinal dimension 11. In its preferred embodiment, the bar 10 is of rectangular cross-section with flat edge surfaces 38, 40, as indicated in FIGS. 5 and 6, and the bar 10 is supported such that its first and second edge surfaces 38, 40 are parallel to the object plane 26. The precision bar 10 is preferably machined of tool steel, hardened and ground.

The gibs 14, 16 are preferably made of hardened anodized aluminum or hardened steel to produce wear resistant surfaces, and to which a preferably dry lubricant has been applied, for example molybdenum disulfide such as sold under the trademark MicroSeal 100-1.

The gibs 14, 16 have respective grooves or channels 42, 44 which, when the gibs 14, 16 are secured to the precision bar 10 in accordance with the present invention, face each other and receive a portion of the bar 10 including a longitudinal portion of the respective edge surfaces 38, 40. The inner web surfaces 43, 45 of the channels 42, 44 are slightly greater in height (as best shown in FIG. 6 augmented by FIG. 7) than the height of the respective respective edge surfaces 38, 40 (i.e., the thickness of the bar 10). The channels 42, 44 are defined by respective gib terminating flange surfaces 46, 48 which extend along the first flat side surface 34, and by respective gib body flange surfaces 50, 52 which may extend inwardly while facing the second flat side surface 36 of the bar 10, with the web surfaces 43, 45 therebetween.

As may be best seen in FIGS. 5, 6 and 7, the gibs 14, 16 contact one another in such manner as to cause the channels 42, 44 of the gibs 14, 16 to pivot toward one another about a pivot line parallel to the longitudinal dimension of the bar 10 and spaced from the second flat side surface 36 of the bar 10. In the preferred embodiment, the pivot line is defined by the line contact between longitudinally extending protrusions 54, 56 along facing surfaces 55, 57 of the respective gibs 14, 16, which protrusions 54, 56 are perpendicularly spaced from the second side surface 36 of the bar 10. The above-described pivot action is produced upon application of a force urging the two gibs 14, 16 toward each other, as by the spring-based screw arrangement shown in FIGS. 3 and 6. Screws 58, biased by respective springs 60, are situated in apertures 61 of the second gib 16, and the screws 58 extend into threaded apertures 62 of the first gib 14. The springs 60 are retained within the second gib 16, between gib shoulders 59 and screw heads 63. The spring-biased screws 58 are axially perpendicular to the pivot line defined by the protrusions 54, 56.

Tightening of the spring-biased screws 58 cause the gibs 14, 16 to pivot inwardly about the pivot line, clamping the gibs 14, 16 against the bar 10. The more the springs 60 are compressed, the greater the clamping of the gibs 14, 16 to the bar 10 and the greater the sliding drag force of the gibs 14, 16 along the edge surfaces 38, 40 of the bar 10. When the adjustment of the screws 58 causes the springs 60 to be compressed to their solid height, the gibs 14, 16 are locked or "pinched" to the bar 10. As the screws 58 are loosened and the spring force is decreased, the sliding drag force is decreased so that the gibs 14, 16 may slide along the bar 10 when urged to do so by an applied force.

The drag force between the gib flange surfaces 46, 48 and the first side surface 34 of the bar 10, is controlled by means of low friction bearing devices as shown in FIG. 5. Pads or disks 64, 66 having low friction surfaces, as may be provided by flourine-containing resin materials such as sold under the trademarks Teflon or Delrin AF, are controllably biased against the second side surface 36 of the precision bar 10. Such biasing is provided by springs 68, 70 situated between the disks 64, 66 and washers 72, 74, when the springs 68, 70 are compressed by tightening set screws 76, 78 within threaded holes 80, 82 of the gibs 14, 16, respectively.

The low friction disks 64, 66 provide bearing surfaces against the second side surface 36 of the precision bar 10, with low break-away force. When the disks 64, 66 are biased against the second side surface 36 of the bar 10, the flanges 46, 48 of the gibs 14, 16 are urged against the first side surface 34 of the bar 10, providing drag forces between the first side surface 34 of the bar 10 and the flanges 46, 48, which drag forces are adjustable by means of the set screws 80, 82.

As seen in FIGS. 1 and 5, the first gib 14 has a pair of threaded holes 80, and the second gib 16 has a pair of threaded holes 82, so that four spring loaded low friction disks are situated within the gibs 14, 16 to prevent rocking of the gibs 14, 16 laterally with respect to the longitudinal dimension of the bar 10 as well as with respect to the width dimension of the bar 10.

As shown in FIG. 2, a position scale 84 may be defined along an edge surface 40 of the bar 10, in order to facilitate precision repositioning of the gibs 14, 16 and hence the OCR head 18. In order to preclude wear between the scale 84 and the clamping device 12, a recess 86 is provided in the second gib's channel web surface 45, permitting the second gib 16 to clear the scale 84 during movement of the clamping device 12 along the precision bar 10.

Other embodiments of the present invention, and modifications and variations of the embodiment presented, may be developed without departing from the essential characteristics thereof. Accordingly, the invention should be limited only by the scope of the claims listed below.

I claim:

1. Linearly positionable apparatus, comprising in combination:

a bar having a longitudinal dimension, first and second flat side surfaces extending along said longitudinal dimension, and first and second edge surfaces extending along said longitudinal dimension between said first and second side surfaces; and a clamping device including a first clamp member having a channel for receiving a portion of said bar including a portion of said first edge surface, a second clamp member having a channel for receiving a portion of said bar including a portion of said second edge surface, first adjustable means for securing said clamp members to one another with said bar being retained by said channels and for controlling the drag force between said clamp members and said edge surfaces when said bar is retained by said secured clamp members and said secured clamp members are slideably urged longitudinally along said bar, and second adjustable means carried by said clamp members and said side surfaces for controlling the drag force between said clamp members and said side surfaces when said bar is retained by said secured clamp members and said secured clamp members are slideably urged longitudinally along said bar, said first adjustable means being adjustable to secure said clamp members to one another with said bar retained by said channels independently of adjustment of said second adjustable means, and said first adjustable means and said second adjustable means being adjustable independently of one another for separately controlling the drag forces respectively controlled thereby.

2. Apparatus according to claim 1, above, wherein said first adjustable means includes means cooperating with said clamp members for adjustably urging said clamp members against said portions of said edge surfaces.

3. Apparatus according to claim 1, above, wherein said first adjustable means includes means for pivoting said clamp members toward one another and said edge surfaces when said clamp members are secured to one another and said bar is retained thereby.

4. Apparatus according to claim 1, above, wherein said first adjustable means includes:

pivot surfaces on each of said clamp members, said pivot surfaces facing and in contact with each other and forming a pivot line parallel to said longitudinal dimension of said bar when said clamp members are secured to one another and said bar is retained thereby, and means for urging said clamp members to pivot toward one another about said pivot line.

5. Apparatus according to claim 1, above, wherein said channels include respective flange surfaces facing said first side surface of said bar when said clamp members are secured to one another and said bar is retained thereby, and wherein said second adjustable means includes means for adjustably urging said flange surfaces against said first side surface of said bar.

6. Apparatus according to claim 1, above, wherein:

said channels include respective flange surfaces facing said first side surface of said bar when said clamp members are secured to one another and said bar is retained thereby; and said second adjustable means includes low friction means contacting said second side surface of said bar and means carried by said clamp members for adjustably urging said low friction means against said second side surface such that said flange surfaces are urged against said first side surface.

7. Apparatus according to claim 1, above, wherein said bar is adapted for being supported such that said longitudinal dimension is parallel to a predetermined plane.

8. Apparatus according to claim 1, above, wherein at least one of said clamp members is adapted for mounting an additional device thereto.

9. Apparatus according to claim 1, above, further including an optical device mounted to one of said clamp members.

10. Apparatus according to claim 1, above, wherein said bar is of rectangular cross-section and said apparatus further includes:

means for supporting said bar such that said edge surfaces are parallel to a predetermined plane; and an optical device mounted to one of said clamp members such that the focal distance between said optical device and the predetermined plane remains substantially constant as said secured clamp members are slideably repositioned along said bar.

11. Apparatus according to claim 1, above, wherein a one of said edge surfaces includes scale indicia therealong, and said channel of said clamp member for receiving said one of said edge surfaces includes a web surface having a recess for precluding contact of said scale indicia by said clamp members.

12. Linearly positionable optical apparatus, comprising in combination:

a precision bar having a longitudinal dimension, first and second flat side surfaces extending along said longitudinal dimension, and first and second edge surfaces extending along said longitudinal dimension between said first and second side surfaces;

means for supporting said bar such that said longitudinal dimension is parallel to a predetermined plane;

a clamping device including a first gib having a channel for receiving a portion of said bar including a portion of said first edge surface, a second gib having a channel for receiving a portion of said bar including a portion of said second edge surface, first adjustable means securing said gibs to one another with said bar being retained by said channels and for controlling the drag force between said gibs and said edge surfaces when said secured gibs are slideably urged longitudinally along said bar, and second adjustable means carried by said gibs for controlling the drag force between said gibs and said side surfaces when said secured members are slideably urged longitudinally along said bar, said first adjustable means being adjustable to secure said gibs to one another with said bar retained by said channels independently of adjustment of said second adjustable means, and said first adjustable means and said second adjustable means being adjustable independently of one another for separately controlling the drag forces respectively controlled thereby; and an optical device mounted to said secured gibs.

13. Optical apparatus according to claim 12, above, wherein said bar is of rectangular cross-section and said bar is supported by said means for supporting such that said edge surfaces are parallel to the predetermined plane.

14. Optical apparatus according to claim 12, above, wherein said first adjustable means includes means cooperating with said gibs for adjustably urging said gibs against said portions of said edge surfaces.

15. Apparatus according to claim 12, above, wherein said first adjustable means includes means for pivoting said gibs toward one another and toward said edge surfaces when said gibs are secured to one another and said bar is retained thereby.

16. Optical apparatus according to claim 12, above, wherein said first adjustable means includes:

pivot surfaces on each of said members, said surfaces facing and in contact with each other and forming a pivot line parallel to said longitudinal dimension of said bar when said gibs are secured to one another and said bar is retained thereby: and means for urging said gibs to pivot toward one another about said pivot line.

17. Optical apparatus according to claim 12, above, wherein said channels include respective flange surfaces facing said first side surface of said bar when said gibs are secured to one another and said bar is retained thereby, and wherein said second adjustable means includes means for adjustably urging said flange surfaces against said first side surface of said bar.

18. Apparatus according to claim 12, above, wherein:

said channels include respective flange surfaces facing said first side surface of said bar when said gibs are secured to one another and said bar is retained thereby; and said second adjustable means includes low friction means contacting said second side surface of said bar and means carried by said gibs for adjustably urging said low friction means against said second side surface such that said flange surfaces are urged against said first side surface.

19. Apparatus according to claim 12, above, wherein a one of said edge surfaces includes scale indicia therealong, and said channel of said gib for receiving said one of said edge surfaces includes a web surface having a recess for precluding contact of said scale indicia by said gibs.

20. Optical apparatus according to claims 12, 13, 14, 15, 16, 17, 18 or 19, above, wherein said optical device is an optical read head and the predetermined plane is adapted for receiving optical indicia to be read.

21. Optical apparatus according to claims 12, 13, 14, 15. 16, 17, 18 or 19, above, wherein said optical device is an optical character recognition read head and the predetermined plane is adapted for receiving optical characters to be read.

* * * * *